Fig. 1

Inventor:
GERHARD FESSMANN

May 26, 1970          G. FESSMANN          3,513,823

SMOKE PRODUCING APPARATUS AND PROCESS OF PRODUCING SMOKE

Filed Oct. 17, 1968          5 Sheets-Sheet 3

Inventor:
GERHARD FESSMANN
BY
Kenyon & Kenyon
ATTORNEYS

Inventor:
GERHARD FESSMANN

United States Patent Office 3,513,823
Patented May 26, 1970

3,513,823
SMOKE PRODUCING APPARATUS AND PROCESS
OF PRODUCING SMOKE
Gerhard Fessmann, Stuttgart, Germany, assignor to
Technical Research Co., Seattle, Wash., a corporation of Washington
Filed Oct. 17, 1968, Ser. No. 768,238
Int. Cl. A01g 13/06
U.S. Cl. 126—59.5
42 Claims

ABSTRACT OF THE DISCLOSURE

The reaction material is fed through a reaction chamber of increasing height while superheated steam is passed downwardly through the reaction chamber to form a smoking medium. The steam presses the reaction material against the floor of the reaction chamber to prevent any stirring up of the reaction material.

---

This invention relates to a smoke producing apparatus and process of producing smoke. More particularly, this invention relates to an apparatus and process for producing a smoking medium for foodstuffs with the use of superheated steam.

The use of superheated steam in smoke producing processes and apparatus has been known, for example, as described in copending U.S. patent application, Ser. No. 515,126, filed Dec. 20, 1965, now Pat. No. 3,462,282. In such processes and apparatus, the superheated steam acts on a reaction material composed of particles, preferably comminuted wood, peat or the like, in order to produce a smoking medium for foodstuffs such as fish, meat, sausage, ham, cheese and the like. Usually, the steam is fed into a reactor space while the reaction material is caused to travel continuously through the reaction space. The reaction material is in particular a substance of a cellulose base, preferably, wood, e.g. wood granulate, sawdust or the like. However, any other material can be used which upon thermal reaction with steam yields a smoking medium similar to that obtained from wood.

It is an object of this invention to guarantee an efficient and economic production of a smoking medium using superheated steam.

It is another object of the invention to prevent the admixture of fresh steam in disturbing amounts to a produced smoking medium in accordance with the above.

It is another object of the invention to substantially prevent the escape of steam into the reaction material inlet and outlet.

It is another object of the invention to generate relatively large quantities of smoking medium.

It is another object of the invention to fully utilize the reaction material in producing a smoking medium.

It is another object of the invention to provide a simple apparatus which is reliable in operation and easily maintained and which can be continuously operated for long periods of time.

It is another object of the invention to produce a smoking medium in a continuous efficient manner.

Briefly, the invention provides an apparatus and process for efficiently producing a smoking medium. The apparatus includes a reaction chamber into which reaction material is fed in a longitudinal direction and into which superheated steam of a temperature of at least 180° C. especially 180° C. to 400° C. and, preferably, 270° C. to 380° C., is fed in a transverse direction in order to press the reaction material against an apertured wall of the reaction chamber while the generated smoking medium is passed out of the apertured wall. The process includes the step of passing the steam cross-wise through the reaction material in the direction of the apertured wall in order to cause a smoke generating reaction material. The superheated steam is introduced into the reaction chamber at a relatively high flow rate without causing a stirring up of the reaction material.

As a result of the increased flow rate of the superheated steam, it is possible to generate within an identical time to other heretofore known processes a correspondingly larger amount of smoking medium. Furthermore, the reaction material situated in the reaction chamber can be uniformly traversed by superheated steam so as to be reacted uniformly and completely.

In order to bring about the pressing, under gravity, of the reaction material introduced into the reaction chamber against the apertured smoke outlet wall, the reaction material can be transported in a vertical direction preferably from the top down. In this case, the reaction chamber practically constitutes an upright tank in such a way that the reaction material in particle form can press circumferentially against the inner wall of the container. However, in one embodiment of the invention the reaction material is conveyed in a direction sloped with respect to the vertical, preferably at an angle from the top down. In another embodiment, the reaction material is conveyed horizontally. In these cases, the outlet wall for the smoking medium is arranged laterally beneath the longitudinal axis of the reaction chamber.

It is particularly favorable if the feeding direction of the reaction material is sloped at an angle of approximately 10–30 degrees, especially approximately 20 degrees, with respect to the horizontal.

In order to have the steam press the reaction material against the smoke outlet wall, the steam is preferably introduced into the reaction chamber through a chamber wall facing the outlet wall and in a direction toward the outlet wall. It has also proven to be particularly favorable to cause the steam to pass through the reaction zone of the reaction space substantially crosswise to the direction of feed of the reaction material.

In a preferred embodiment of the invention wherein wood particles are used as the reaction material, the temperature of the superheated steam, and the smoking medium generated by it, is maintained in the reaction chamber at temperatures above 100° C., thereby preventing a condensing of the steam on the reaction material and, as a result, making it possible to keep the humidity of the reaction material low.

Should the danger exit that residues of the consumed reaction material might deposit on the walls of the reaction chamber, the walls can be heated. To this end, a heating means is installed in the area of the outlet openings in the outlet wall for the smoking medium. The walls in this arrangement can be suitably heated to a temperature between 50 to 270° C. whereby, on the one hand, the reaction material is unable to adhere to the walls, while, on the other hand, the reaction material is prevented from becoming exposed to dry distillation as a result of an excessive temperature.

At this juncture, it is to be pointed out again that, without being limited thereto, the invention refers in particular to the decomposition and other chemical reactions not particularly known of finely divided wood particles by means of superheated steam, whereby a smoking medium is obtained that is particularly favorable for the smoking of foodstuffs. The particle thickness of the reaction material can, for instance, be suitably 0.5–4 mm. and the particle length, for instance, 2–10 mm. The reaction material can, for instance, advantageously be coarse sawdust, sawmill wastes or the like obtained as by-products in saw mills.

According to the process the manufacture of the smoking medium can readily take place continuously in view of the fact that the reaction material can be continuously fed through the reaction chamber. Also, the movement of the reaction material can be carried out continuously or, if indicated, in individual steps or stages.

In one embodiment of the apparatus of the invention, the reaction chamber cooperates with a feeding device through a reaction material inlet for the supply of reaction material, a conveying means for conveying reaction material through the reaction space, and an outlet for expeling spent reaction material. In addition, the reaction chamber is provided with an inlet for superheated steam and an outlet for the resultant smoking medium. The outlet for the smoking medium includes at least one outlet opening in an outlet wall of the reaction chamber which wall is arranged laterally of the longitudinal axis of the reaction chamber and is disposed in such a way that the freshly introduced reaction material comes to rest against it and is pressed against it by the steam flowing into the reaction chamber via the steam inlet.

The entire reaction chamber is preferably partially or substantially filled by the reaction material while the super-heated steam is introduced into the reaction chamber through a boundary wall designed as a steam inlet wall which is situated diametrically opposite the outlet wall for the smoking medium and is provided with at least one inlet opening.

It is particularly advantageous if the reaction chamber has a rectangular, preferably square, or an oval or trapezoidal cross-section in the feed direction of the reaction material, since a particularly effective reaction of the reaction material can be achieved therewith and since such improves the feed of the reaction material through the reaction chamber. In a particularly advantageous embodiment, the reaction chamber can be designed in such a way that its cross-section can be suitably adapted in any zone to the differential volume of the reaction material resulting from reaction.

The feeding of the reaction material through the reaction space can be facilitated by constantly increasing the space between the steam inlet wall and the smoking medium outlet wall in the feed direction of the reaction material at least along a partial area, and preferably over the entire length of the reacted chamber, for example, linearly. As a result, a reliable and easy feed of the reaction material in the reaction chamber is obtained. In view of the fact that the reaction material decreases in volume in the course of the reaction, it is in many instances also suitable to constantly decrease the spacing between the two lateral walls of the reaction chamber which join the steam inlet wall and the smoking medium outlet wall in at least a partial zone in the direction of feed of the reaction material. The interior cross-section of the reaction chamber is however to be generally greater at the reaction material outlet than at the opposite inlet.

In a further embodiment of the invention, a heating means is arranged in at least one partial zone of the outer wall of the reaction chamber in order to prevent the adherence of any residue of the consumed reaction material, in particular wood granulate, or residues of the smoking medium. Such a heating means can, for instance, be provided wherein the respective outer area or areas of the reaction chamber form the boundary walls of a space in which superheated steam, such as that flowing into the reaction chamber, is situated. The respective wall sections of the reaction chamber are thus substantially at the temperature of the superheated steam fed into the reaction chamber.

In addition to the above heating means, an auxiliary heating means which is independent of the superheated steam supply for at least a partial area of the outer wall of the reaction chamber can be used. In this instance, the auxiliary heating means can be used to heat the reaction chamber during downtime. Such an auxiliary means can, for instance, be constructed by forming the respective part of the wall of the reaction chamber as a double wall and by filling the interior of the double wall with a heat transfer agent, such as glycerin or the like, of a temperature which is set to the desired heating temperature.

It has been found that where the outlet openings for the smoking medium have an inside width of at least 3.0–5.5 mm. they cannot be blocked by the reaction material. This holds true in particular with regard to a reaction material made of sawdust, fine sawmill wastes or a wood granulate with particles having a thickness of approximately 0.5–4 mm. Also, it is particularly advantageous to form the outlet openings for the smoking medium in the shape of slots which run in the direction of feed of the reaction material. In many instances, circular or similarly shaped outlet openings can be provided in lieu of or in addition to the slots.

In another embodiment, the reaction chamber is provided with wall sections which surround the smoking medium outlet openings and which are formed as hollow members so that a heating medium, for instance, glycerin, etc., having a certain desired temperature, can be passed therethrough, for the heating of the respective edges of the outlet openings. With such a heating arrangement, it is no longer necessary to provide cleaning or maintenance of the outlet opeings for the smoking medium in view of the fact that these openings remain clean practically at all times. In lieu of the aforementioned hollow heating members any other suitable heating means, if need be, an electric heating element, can be provided.

The apparatus of the invention thus not only allows the superheated steam to have an elevated flow rate, but also provides a lengthy reaction path with the reaction material. This achieves a favorable heat exchange between the superheated steam and the reaction material and hence a high efficiency. It has furthermore been found that the period of time of the superheated steam in the reaction chamber is increased upon introducing of the superheated steam downwardly or horizontally in view of the fact that the superheated steam, as a result of its elevated temperature, has a very strong buoyancy tending to guide it vertically upwardly counter to the direction of inflow. As a result of this effect, the reaction of the reaction material in the smoking medium is improved even further. This effect becomes particularly efficient if the longitudinal axis of the reaction chamber is sloped at an angle of approximately 10–30° with respect to the horizontal.

In another embodiment of the invention, means are provided for preventing an uncontrolled escaping of superheated steam into the reaction material inlet or reaction material outlet of the reaction chamber. Likewise, means can be provided to prevent, at least substantially, a shunting of the superheated steam around the reaction zone proper from the steam inlet to the smoking medium outlet. This latter means can, for example, include at least one receiving area for fresh or used up reaction material which adjoins the reaction zone and which is designed in such a way that the reaction material situated therein constitutes a seal that cannot be traversed, or else cannot be traversed in disturbing amounts, by the superheated steam. To this end, at least one reduced area for the fresh reaction material is provided in the direction of feed in front of the reaction zone wherein the reaction material can be compacted in order to form such a seal. For example, where a worm conveyor is used to feed the reaction material, the worm conveyor can be mounted adjacent to the reaction material input of the reaction chamber and can be formed to effect the desired compaction of the reaction material for sealing purposes. Likewise, the spacing of the reaction zone between the superheated steam inlet wall and the smoking outlet wall from the respective reaction material inlet and the reaction material outlet can be made so great that the reaction materials situated within these spaces laterally adjoining the reaction zone proper form a seal against the uncontrolled escape of steam from either end of the reaction chamber.

A particularly advantageous seal of the reaction material outlet can be achieved by this means alone or else by complementing the aforementioned measures in providing the outlet with a lock having at least one lock chamber for the reaction material.

In order to be able to readily discharge the agglomerated reaction material from the reaction chamber, at least one shear member in the form of a rotating pin or the like is provided near the reaction material outlet with a drive which is suitably connected with that of the infeed device.

These and other objects and advantages of the invention will become more apparent from the following detailed description and appended claims taken in conjunction with the accompanying drawings in which:

Figure 1:
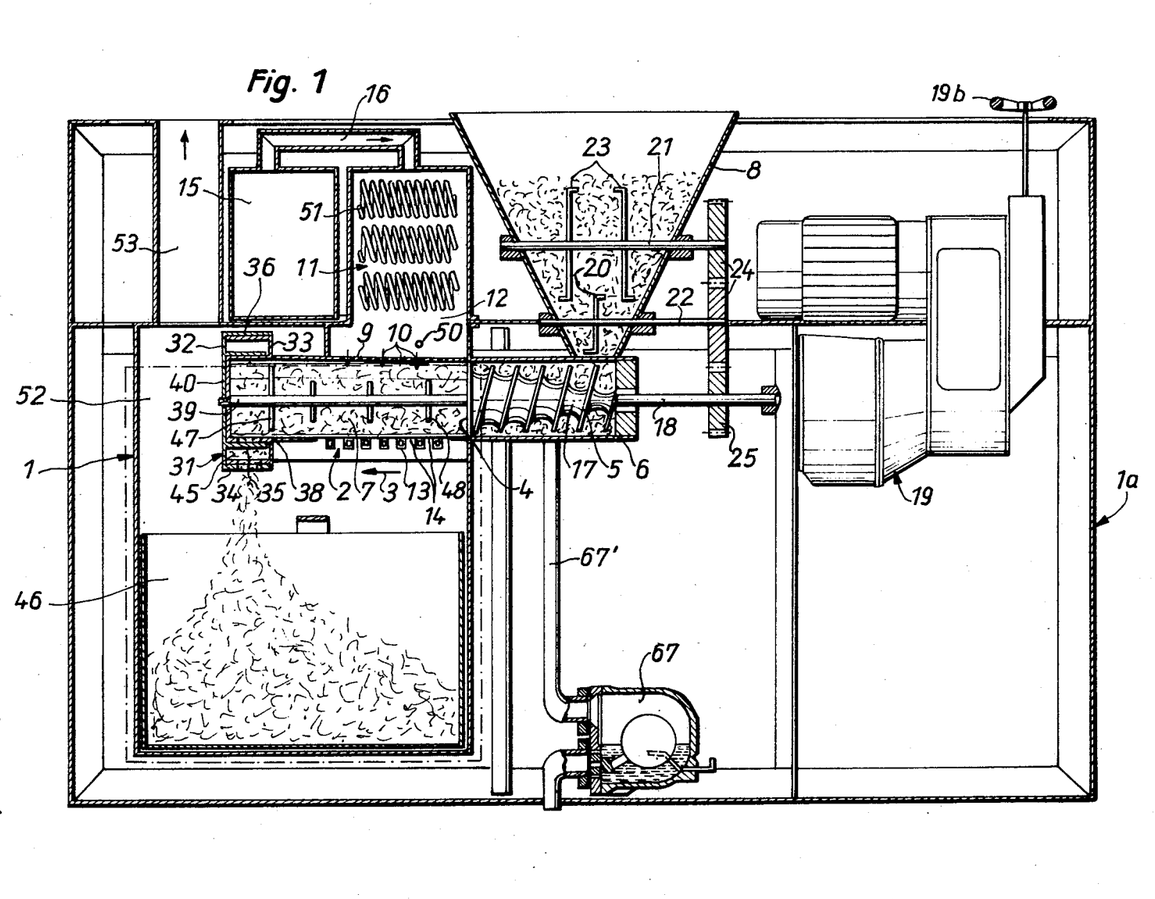
FIG. 1 illustrates a cross-sectional view of a smoke producing apparatus according to the invention.

Referring to FIG. 1, the smoke producing apparatus includes a box-like outer housing 1a in which a heat insulated housing 1 is confined. In addition, a duct-like reaction chamber 2 is mounted within the insulated housing 1 in a substantially horizontal plane and communicates with the exterior of the insulating housing 1 through an inlet 4. A worm conveyor 5 is mounted in a worm gear housing 6 coaxially outside the reaction chamber 2 in order to feed reaction material 7, for example, finely divided wood chips, continuously into the reaction chamber 2 from a hopper 8 which functions as a storage bin for the reaction material.

The reaction chamber 2 which is of substantially rectangular cross-section with rounded corners has an upper wall 9 in which a plurality of inlet openings 10 are formed. A steam superheater 11 is mounted above the reaction chamber 2 and has an outlet 12 in communication with the inlet openings 10 of the reaction chamber 2 in order to direct a flow of uncooled superheated steam downwardly into the reaction chamber 2 via the inlet openings 10. In addition, the reaction chamber 2 has a flat bottom wall 13 which is formed with a plurality of outlet openings 14. Upon passage of the superheated steam through the reaction material 7 in the reaction chamber 2, a smoking medium is obtained and passed out through the outlet openings 14 in the bottom wall 13. In passing through the reaction chamber 2, the superheated steam presses the reaction material 7 against the bottom wall 13 so as to prevent stirring up of the reaction material 7.

In order to supply steam to the superheater 11, an evaporator 15 in which water can be evaporated is mounted adjacent the superheater 11 and connected to the superheater 11 via a line 16. Alternatively, steam can be supplied to the evaporator 15 from an outside source such as a steam plant. The resultant water of condensation in the evaporator is discharged through an outlet (not shown) in the floor of the evaporator 15 into an inlet line 67' of a condensate drain 67.

The worm conveyor 5 has a core 17 of increasing cross-section in the direction of feed (arrow 3) in order to compact the reaction material 7 in the direction of feed in the worm-gear housing 6 so as to seal off the reaction chamber 2 at the reaction material inlet 4 against an escape of water vapor. In addition, the worm conveyor 5 is driven over a shaft 18 by means of a gear motor 19, the gear ratio of which can be adjusted by means of the regulator wheel 19b. The gear motor 19 further drives a pair of shafts 21, 22 which pass through the hopper 8 and on which agitation blades 20, 23 are mounted and likewise situated within the hopper 8. Upon rotation of the agitator blades 20, 23 a continuous supply of the reaction material 7 from the hopper 8 is ensured for the worm-gear housing 6. The shafts 21, 22 are driven via gears 24 located outside the hopper 8, which engage one another and a gear 25 which is fixed on the worm-gear shaft 18.

Figure 3:
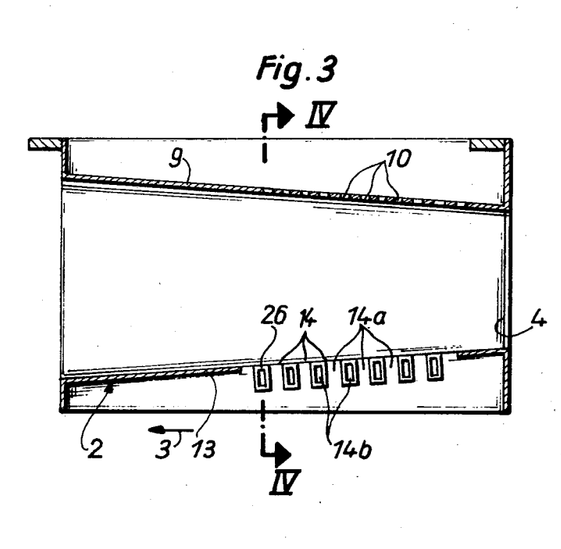
FIG. 3 illustrates an enlarged schematic longitudinal view of the reaction chamber of FIG. 1.
Figure 4:
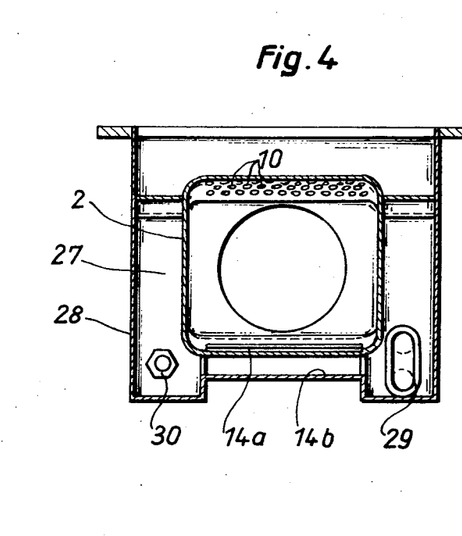
FIG. 4 illustrates a view taken on line IV—IV of FIG. 3.

Referring to FIGS. 3 and 4, the cross-section of the reaction chamber is enlarged in the vertical plane in the direction of feed (arrow 3) by sloping the upper wall 9 and the bottom outlet wall 13 in a divergent pattern from each other so that the spacing with respect to one another continuously increases, for example, linearly, in the direction of feed. As shown in FIG. 3, the outlet openings 14 are constituted by longitudinal slots 14a which extend crosswise or transverse to the direction of feed. However, these slots 14a can also more advantageously be disposed substantially parallel to the direction of feed. The slots 14 are separated by longitudinal webs 26 designed as hollow profiled elements 14b which are connected to a liquid bath 27 (FIG. 4) partially surrounding the reaction chamber 2. The liquid bath 27, constituted in this instance by a tank 28 partially surrounding the reaction chamber 2 can, for instance, be filled with oil, with the temperature of the oil being adjusted to a variable, constant temperature. To this end, the tank 28 is provided with a heating element 29 controllable by a thermostat 30. Alternatively, the webs 26 between the slots 14a can be designed as electrical heating elements in which case the tank 28, surrounding the reaction chamber 2 is not provided with oil but rather is connected with the steam superheater 11 in such a way (not shown) that superheated steam can flow into the tank 28 for heating purposes.

Figure 5:
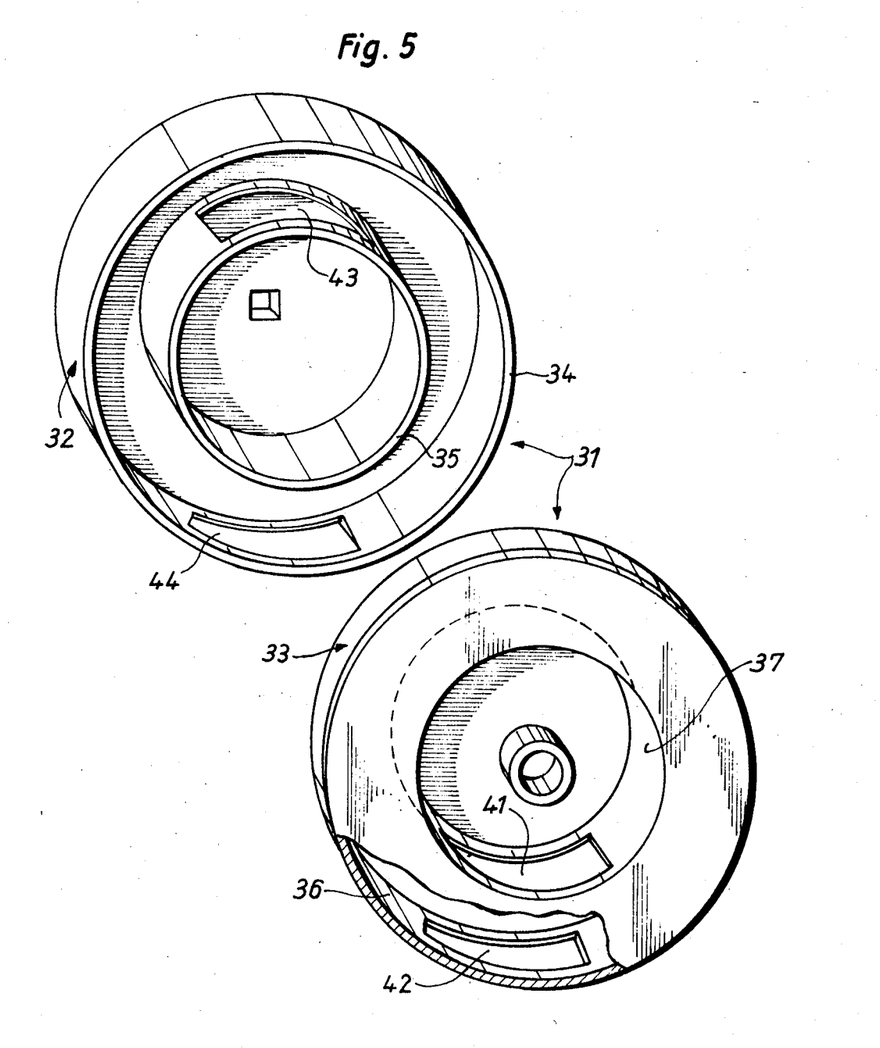
FIG. 5 illustrates an exploded perspective view of the lock used in the apparatus of FIG. 1.

Referring to FIGS. 1 and 5, a lock 31 is mounted over the outlet end of the reaction chamber 2. The lock 31 comprises a lock chamber, which consists of two lock sections 32, 33. Each lock section 32, 33 has two ring elements 34, 35 and 36, 37 situated coaxially with respect to one another. One lock section 33 is fixed over the front end 38 of the reaction chamber 2, with the space spanned by the inner ring element 37 connected coaxially to the reaction chamber 2. The other lock section 32 is slidably mounted over the stationary lock section 33 with the inner ring element 35 rotatably received in the outerface of the inner ring element 37 of the stationary lock section 33. In addition, the rotatable lock section 32 is mounted on a shaft 39 situated coaxially thereto so as to be displaced in the direction of rotation. In like manner, the outer ring element 34 of the rotatable lock element 32 slides over the outer face of the outer ring element 36 of the stationary lock section 33. The front side of the rotary lock section 32 facing away from the reaction chamber 2 is closed off by means of a floor wall 40. The ring elements 36, 37 of the stationary lock section 33 are provided in their lower area with rectangular recesses 41, 42 in tiered arrangement. Corresponding recesses 43, 44 are provided at the ring elements 35, 34 of the rotatable lock section 32 however, these two recesses 43, 44 are displaced by 180° with respect to one another.

During operation, the reaction material 7 is moved in the reaction chamber 2 in the direction of feed (arrow 3) and upon reaching the space surrounded by the inner ring element 37 of the stationary lock element 33 drops into the annular chamber 45 of the lock 31 the moment the recess 43 of the inner ring element 35 of the rotatable lock section 32 is aligned with the recess 41 of the inner ring element 37 of the stationary lock section 33. In view of the fact that the recesses 43, 44 are displaced with respect to one another, at the moment at which the reaction material 7 drops into the annular chamber 45 of the lock 31, the annular chamber 45 is completely closed to the outside. Upon further rotation of the rotatable lock section 32, the recess 44 in the outer ring element 34 comes into the plane of the recess 42 of the stationary lock section 33 so that the reaction material situated in the annular chamber 45 can drop outside. A collector tank 46 is mounted below the lock 31 in an insulated space 52 to receive the spent reaction material. This tank 46 can be removed from the housing 1 in order to dispose of the spent material. The insulated space 52 also includes a discharge line 53 for the exiting of the smoking medium.

Referring to FIG. 1, the shaft 39 for the drive of the lock 31 is run through the reaction chamber 2 and attached to the worm conveyor 5 so that the lock 31 can be driven jointly with the worm conveyor 5 over the adjustable gear drive 19.

In the area of the rear end 38 of the reaction chamber 2, that is, in front of the space enclosed by the inner ring element 37 of the stationary lock section 33, a shear member 47 in the form of a diametral pin is mounted on the shaft 39 so that the reaction material agglomerated under the effect of the superheated steam is loosened up and fed into the lock 31 in this loosened up state. Further, feeder vanes 48 in the form of diametral pins or the like are mounted along the shaft 39 within the reaction chamber in order to guarantee an easier feed of the reaction material 7 in the reaction chamber 2.

Referring to FIG. 1, a sensor 50 of a thermostat (not shown) is positioned at the outlet 12 of the superheater 11 so as to allow regulation of the heat capacity of the heating elements 51 of the superheater 11 and hence the steam temperature. Also, the smoking medium outlet openings 14 of the reaction chamber 2 communicate with a flow chamber 52 which is provided with an exhaust duct 53 for the smoking medium.

Figure 2:
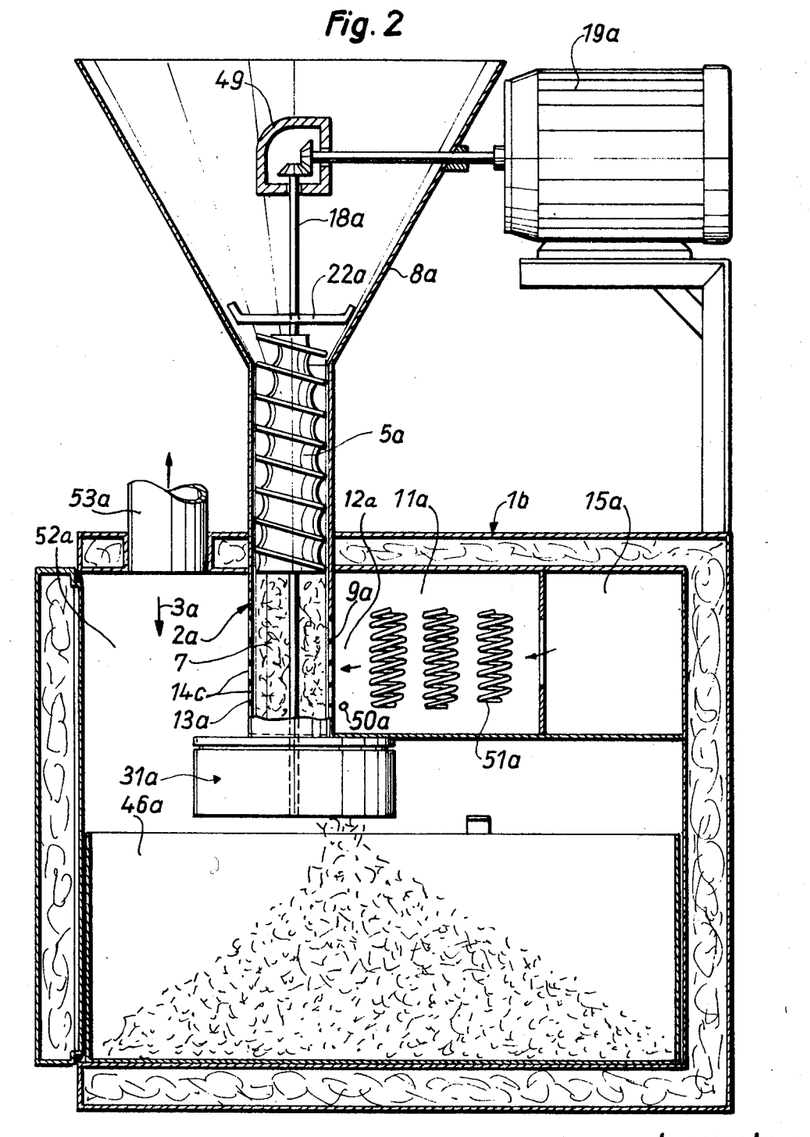
FIG. 2 illustrates a cross-sectional view of a modified apparatus of the invention.

Referring to FIG. 2, the reaction chamber 2a can alternatively be mounted in a heat insulated housing 1b in a vertical plane and the reaction material 7 can be fed downwardly in the feed direction indicated by the arrow 3a. In this instance, the reaction chamber 2a has a lateral wall 9a in which a plurality of superheated steam inlet openings are formed to communicate with an adjacent steam superheater 11a and evaporator 15a. Also, the reaction chamber 2a has an opposite wall 13a in which a plurality of smoking medium outlet openings 14c are formed. The upper end of the reaction chamber 2a is connected to a conveyor worm 5a as above which is actuated over a coaxial drive shaft 18a by an angle drive 49 situated in a hopper 8a as above by means of a motor 19a. An agitator blade 22a is also situated within the hopper 8a and fixed to the drive shaft 18a in order to loosen the reaction material 7. The lower end of the reaction chamber 2a is provided with a lock 31a similar to that described above which is disposed above a collector tank 46a within the housing 1b.

As above, a sensor 50a of a thermostat (not shown) is positioned near the outlet 12a of the steam superheater 11a so as to regulate the heat capacity of the heating elements 51a, of the steam superheater 11a, and hence to regulate the steam temperature.

Furthermore, the smoking medium outlet openings 14c of the reaction chamber 2a open to a flow chamber 52a (not shown in detail) for the smoking medium, which is provided with an exhaust duct 53a for the smoking medium.

The remainder of the smoke producing apparatus is similar to that described above and similar components have been indicated with like reference numerals.

Figure 6:
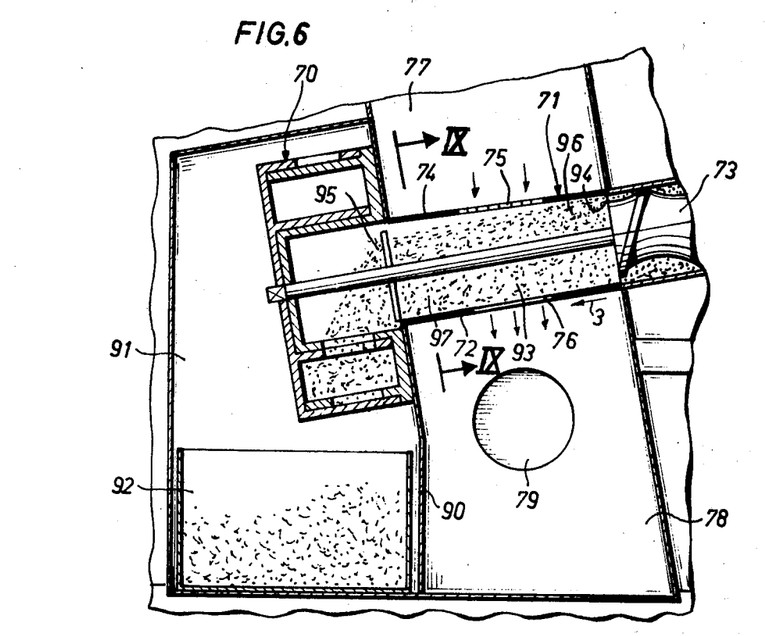
FIG. 6 illustrates a cross-sectional view of another modified apparatus of the invention.
Figure 7:
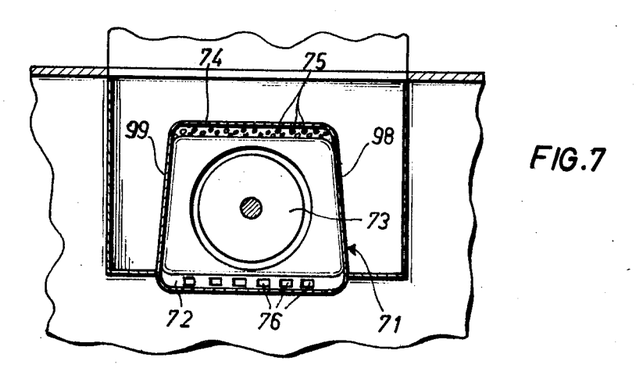
FIG. 7 illustrates a view taken on line IX—IX of FIG. 6.

Referring to FIGS. 6 and 7, the reaction chamber 71 can be arranged at an angle with respect to the horizontal with the flat, lower smoking medium outlet wall 72 forming an angle of approximately 12 degrees with the horizontal. In other respects (not shown) the smoke producing apparatus utilizing this reaction chamber 71 corresponds with that described above with regard to FIG. 1. Further, the lock 70 corresponds to the lock 31 desecribed with regard to FIG. 5, and the worm conveyor 73 to the worm conveyor 5 described with regard to FIG. 1.

The reaction chamber 71 is of substantially trapezoidal cross-section with the wide base side or floor side forming the smoking medium outlet wall 72 and the narrow upper side forming the superheated steam inlet wall 74. Both walls 72, 74 have a plurality of openings of which the inlet openings 75 for the steam are circular and the outlet openings 76 for the smoking medium are longitudinal slots extending parallel to the longitudinal axis of the reaction chamber. The superheated steam flows through a chamber 77 above the reaction chamber toward the reaction chamber while the smoking medium flows through a chamber 78 below the reaction chamber into a discharge line 79 leading to a smoking chamber (not shown).

The chamber 78 is hermetically sealed with respect to an adjacent chamber 91 in which the spent reaction material is ejected from the lock 70 by means of a partition 90. This chamber 91 houses a collector tank 92 for collecting the ejected material. As a result of the separation of the chamber 78 and 91, the entrance of spent reaction material into the smoke discharge line 79 is prevented. Additionally, the reaction material collected in the storage tank 92 can be removed without any opening of the smoking medium passage chamber 78, thereby achieving an extended, uninterrupted period of operation.

In order to further seal the reaction zone 93 from the reaction chamber 71, the steam inlet openings 75 and the smoke outlet openings 76 of the reaction chamber are respectively arranged at a distance from the reaction material inlet 94 and the reaction material outlet 95. The distance is slightly greater than the mean inside elevation of the reaction chamber. As a result, a layer 96, 97 of fresh or spent reaction material exists in front and in the rear of the reaction zone 93, extending substantially only in the area between the reactor chamber wall sections provided with the openings 75, 76. These layers form seals that prevent or substantially forestall an undesired shunting of superheated steam, as well as an escape of steam into the reaction chamber material inlet or the reaction material outlet.

It is pointed out at this juncture that outside the described reaction zone 93, which comprises only a partial area of the reaction chamber 71, there does not occur any or no substantial reaction between the superheated steam and the reaction material.

Referring to FIG. 1, in operation, the reaction material 7 is introduced continuously into the reaction chamber by means of the worm conveyor 5 and, as a result of the feed action exerted by the worm conveyor 5, is also pressed through the reaction chamber 2 and subsequently reaches the lock 31 and from there the collecting tank 46 for the spent reaction material. The superheated steam is introduced into the reaction chamber 2 at a temperature of, for example, approximately 270°–380° C. crosswise to the direction of feed of the reaction material and traverses the reaction material crosswise to its direction of feed. In the process, this superheated steam thermally decomposes the reaction material in the resultant reaction zone and caused other reactions not particularly known and a smoking medium is produced which, due to the effect of the superheated steam continuously entering the reaction zone under an excess pressure, is exhausted through the smoking medium outlet, i.e., through the outlet openings 14 provided in the outlet wall 13 into the adjacent passage chamber 52. From this passage chamber 52, the smoking medium is conveyed by means of a discharge line 53 into a smoking chamber (not shown) wherein the foodstuffs to be smoked are situated. Since the reaction material is present in finely divided form, i.e., in small particles, a rapid and effective thermal reaction of the reaction material is achieved in the reaction zone.

The operation of the apparatus shown in FIG. 2 and FIG. 6 is similar to that described above and need not be further described.

The invention allows elevated flow rates for the superheated steam in passing through the reaction zone while also achieving a complete decomposition or reaction of the reaction material so that, considered on the whole, a high efficiency is obtained.

It is noted that the difference in pressure between the steam introduced into the reaction chamber and the smoking medium exhausted can be, for instance, 100 mm. water column in the case of coarse sawdust and a sawdust layer of approximately 60 mm..

It is also noted that in the embodiments described above that the superheated steam is further passed through the reaction material owing to its inherent pressure. This inherent pressure can be adjusted in a steam generator in per se known manner to the desired pressure level. As a rule, it is sufficient to adjust the steam pressure to a suitable level in the evaporator 15 (FIG. 1), e.g., to a pressure of approximately 0.1 atm. excess pressure.

With regard to FIG. 7, it is to be pointed out that, as a result of the trapezoidal cross-section of the reaction chamber, the following benefits are achieved, namely, the flow rate of the steam drops in the direction toward the outlet openings 76, which is advantageous for the reaction. The outlet openings can be advantageously arranged at a distance of at least 6 mm. from the parallel lateral walls 98, 99 of the reaction chamber 71, thereby effectively preventing a shunting of the steam along the side walls 98, 99.

It is furthermore suitable that the straight or direct path of the steam through the reaction material is less than the length of the reaction chamber, i.e. the thickness of the layer of reaction material, measured in the main direction of flow of the steam, is smaller than the length of the reaction chamber, as illustrated for instance in FIG. 6.

What is claimed is:

1. Apparatus for producing a smoking medium comprising
    a reaction chamber having a reaction material inlet, a reaction material outlet, a steam inlet between said inlet and said outlet, and a wall including at least one smoking medium outlet opening between said reaction material inlet and outlet, said wall being disposed laterally of the longitudinal axis of said reaction chamber to receive reaction material thereon;
    means for feeding reaction material through said reaction material inlet into said reaction chamber and onto said wall; and
    means for directing superheated steam through said steam inlet into said reaction chamber towards said wall whereby the reaction material is pressed against said wall during reaction caused by the superheated steam to produce a smoking medium.

2. An apparatus as set forth in claim 1 wherein said reaction chamber is of rectangular cross-section transversally of said longitudinal axis.

3. An apparatus as set forth in claim 1 wherein said reaction chamber is square in cross-section.

4. An apparatus as set forth in claim 1 wherein said reaction chamber is of oval cross-section transversally of said longitudinal axis.

5. An apparatus as set forth in claim 1 wherein said reaction chamber is of trapezoidal cross-section transversally of said longitudinal axis.

6. An apparatus as set forth in claim 5 wherein said wall constitutes the wider base of said reaction chamber.

7. An apparatus as set forth in claim 1 wherein said wall is disposed in a vertical plane.

8. An apparatus as set forth in claim 1 wherein said wall is sloped with respect to the horizontal and is located below said longitudinal axis.

9. An apparatus as set forth in claim 1 wherein said wall is disposed in a horizontal plane and constitutes a floor of said reaction chamber.

10. An apparatus as set forth in claim 1 wherein said reaction chamber includes a second wall having said steam inlet therein and being disposed in opposition to said wall having said smoking medium outlet opening therein.

11. An apparatus as set forth in claim 10 wherein said walls diverge constantly from each other at least partially along said longitudinal axis in the direction of said reaction material outlet.

12. An apparatus as set forth in claim 11 wherein said walls diverge entirely along said longitudinal axis.

13. An apparatus as set forth in claim 10 wherein said reaction chamber includes a pair of opposite lateral walls connecting said steam inlet wall and said smoking medium outlet wall, said lateral walls narrowing towards each other at least partially along said longitudinal axis in the direction of said reaction material outlet.

14. An apparatus as set forth in claim 1 wherein said reaction chamber is of larger cross-section at said reaction material outlet than at said reactioin material inlet.

15. An apparatus as set forth in claim 1 which further comprises a steam chamber disposed laterally along said reaction chamber for heating an outer wall of the reaction chamber.

16. An apparatus as set forth in claim 1 wherein said smoking medium outlet is a slot having an inside width of at least 3 millimeters.

17. An apparatus as set forth in claim 16 wherein said slot extends substantially parallel to the direction of movement of the reaction material in said reaction chamber.

18. An apparatus as set forth in claim 1 further comprising a heating means along at least a portion of the edge of said smoking medium outlet for heating said edge area.

19. An apparatus as set forth in claim 1 wherein said steam inlet is spaced from said reaction material inlet whereby reaction material in the space between the plane of said steam inlet and said reaction material inlet forms a seal to substantially prevent escape of steam from said reaction chamber into said feeding means.

20. An apparatus as set forth in claim 1 wherein said feeding means includes a reduced area adjacent said reaction material inlet forecompacting of the reaction material therein to seal said reaction chamber against the escape of steam therefrom.

21. An apparatus as set forth in claim 1 wherein said steam inlet is spaced from said reaction material outlet whereby reaction material in the space between the plane of said steam inlet and said reaction material outlet forms a seal to substantially prevent escape of superheated steam through said smoking medium outlet and said reaction material outlet.

22. An apparatus as set forth in claim 1 further comprising means over said reaction material outlet of said reaction chamber for blocking the removal of steam through said reaction material outlet.

23. An apparatus as set forth in claim 22 wherein said blocking means includes a lock having at least one locking chamber therein for receiving spent reaction material from said reaction chamber in sealed relation thereto.

24. An apparatus as set forth in claim 23 wherein said lock has a stationary lock section fixed to said reaction chamber and a movable lock section coacting with said stationary lock section to form said locking chamber therebetween, said movable lock section being preferably operably connected to said feeding means.

25. An apparatus as set forth in claim 1 further comprising a movable shear member in said reaction chamber between said steam inlet and said reaction material outlet for comminuting agglomerated spent reaction material therebetween.

26. An apparatus as set forth in claim 1 further comprising a passage chamber in communication with said smoking medium outlet to receive smoking medium therefrom and a storage chamber in communication with said reaction material outlet to receive and store spent reaction material therefrom, said passage chamber and said storage chamber being hermetically sealed from each other.

27. An apparatus as set forth in claim 1 wherein said reaction chamber includes a second wall having said steam inlet therein and a pair of opposite lateral walls connecting said steam inlet wall and said smoking medium outlet wall and wherein said lateral walls are parallel.

28. An apparatus as set forth in claim 10 wherein the distance between said steam inlet wall and said smoking medium outlet wall is less than the distance between said reaction material inlet and said reaction material outlet.

29. An apparatus as set forth in claim 1 wherein said smoking medium outlet is spaced a distance of at least 6 millimeters from adjacent lateral walls, said lateral walls connecting said smoking medium outlet wall and said steam inlet.

30. A process of producing a smoking medium for food stuffs comprising the steps of
conveying a reaction material through a reaction zone of a reaction chamber having an apertured wall; and
feeding a stream of superheated steam into the conveyed reaction material in said reaction zone in a direction to press the reaction material against the apertured wall while reacting with the reaction material to generate a smoking medium.

31. A process as set forth in claim 30 wherein the reaction material is conveyed longitudinally through said reaction zone on an angle with respect to the horizontal and the smoking medium is discharged from the bottom of said reaction zone through the apertured wall.

32. A process as set forth in claim 31 wherein the reaction material is conveyed on an angle of from 10° to 30° with respect to the horizontal.

33. A process as set forth in claim 31 wherein the reaction material is conveyed on a downwardly directed angle.

34. A process as set forth in claim 30 wherein the reaction material is conveyed downwardly in a vertical plane.

35. A process as set forth in claim 30 wherein the reaction material is conveyed in a horizontal plane and the smoking medium is discharged from the bottom of said reaction zone through the apertured wall.

36. A process as set forth in claim 30 wherein the stream of superheated steam is fed into said reaction zone from a side opposite the apertured wall.

37. A process as set forth in claim 30 wherein the stream of superheated steam passes transversely through the reaction material in said reaction zone to generate the smoking medium.

38. A process as set forth in claim 30 wherein the temperature of superheated steam and smoking medium is maintained in excess of 100° C. in said reaction zone.

39. A process as set forth in claim 30 which further comprises the step of heating at least a portion of said reaction zone.

40. A process as set forth in claim 39 wherein said portion of said reaction zone is heated to a temperature between 50° C. and 270° C.

41. A process as set forth in claim 30 which further comprises the step of heating the apertured wall within said reaction zone.

42. A process as set forth in claim 30 in which the straight way of the steam through the reaction material is shorter than the way of the reaction material through the reaction chamber.

References Cited

UNITED STATES PATENTS

| 2,265,857 | 12/1941 | Reynoldson | 126—59.5 |
| 2,677,038 | 4/1954 | Reynoldson | 126—59.5 |
| 3,012,124 | 12/1961 | Weissman | 126—59.5 |
| 3,258,003 | 6/1966 | Turner | 126—59.5 |

FOREIGN PATENTS

| 891,350 | 9/1953 | Germany. |

CHARLES J. MYHRE, Primary Examiner

U.S. Cl. X.R.

99—259

UNITED STATES PATENT OFFICE
CERTIFICATE OF CORRECTION

Patent No. 3,513,823  Dated May 26, 1970

Inventor(s) Gerhard Fessmann

It is certified that error appears in the above-identified patent and that said Letters Patent are hereby corrected as shown below:

In the heading to the printed specification, lines 4 to 6, cancel "assignor to Technical Research Co., Seattle, Wash., a corporation of Washington".

Signed and sealed this 1st day of June 1971.

(SEAL)
Attest:

EDWARD M. FLETCHER, JR.
Attesting Officer

WILLIAM E. SCHUYLER, JR.
Commissioner of Patents